United States Patent [19]

Karl

[11] Patent Number: 5,527,061
[45] Date of Patent: Jun. 18, 1996

[54] ANTI-ROLL VEHICULAR SUSPENSION SYSTEM AND A HYDRAULIC ROTARY ACTUATOR SYSTEM IN AN ANTI-ROLL VEHICULAR SUSPENSION SYSTEM

[75] Inventor: Adolf Karl, Schweinfurt, Germany

[73] Assignee: Fichtel & Sachs AG, Schweinfurt, Germany

[21] Appl. No.: 331,890

[22] Filed: Oct. 31, 1994

[30] Foreign Application Priority Data

Nov. 5, 1993 [DE] Germany .................. 43 37 771.8

[51] Int. Cl.⁶ ............................................. B60G 11/18
[52] U.S. Cl. ................................................... 280/723
[58] Field of Search ............................. 280/665, 723, 280/726, 689, 721, 772; 267/277, 278, 188; 403/292, 354, 383, 345, 362

[56] References Cited

U.S. PATENT DOCUMENTS

| 1,016,748 | 2/1912 | Howland | 403/292 |
| 3,730,332 | 5/1973 | Benzon et al. | 403/292 |
| 4,206,935 | 6/1980 | Sheppard et al. | 280/723 |

FOREIGN PATENT DOCUMENTS

| 0428439 | 5/1991 | European Pat. Off. | 280/723 |
| 0221909 | 9/1987 | Japan | 280/689 |

OTHER PUBLICATIONS

"Sachs–Boge: Mit ADC und ARS mehr Sicherheit und Komfort", Schweinfurter Tagblatt, Jun. 13, 1992, p. 2.
"Automatische Dämpfung und Wankstabilisierung", Intelligenz fürs Fahrwerk, p. 9. Aug. 1992.

*Primary Examiner*—Paul N. Dickson
*Attorney, Agent, or Firm*—Nils H. Ljungman & Associates

[57] ABSTRACT

An anti-roll vehicular suspension system and a hydraulic rotary actuator system in an anti-roll vehicular suspension system with a hydraulic rotary actuator in a two-part stabilizer apparatus, having a first stabilizer part, which is non-rotationally connected to a rotary actuator shaft, and a second stabilizer part, which is connected non-rotationally to a rotary actuator housing, whereby a plug-in connection with a mounting bracket serves as a connection between the stabilizer part and the rotary actuator.

4 Claims, 2 Drawing Sheets

ANTI-ROLL VEHICULAR SUSPENSION SYSTEM AND A HYDRAULIC ROTARY ACTUATOR SYSTEM IN AN ANTI-ROLL VEHICULAR SUSPENSION SYSTEM

BACKGROUND OF THE INVENTION

1. Field of the Invention

This invention relates to an anti-roll vehicular suspension system and a hydraulic rotary actuator system in an anti-roll vehicular suspension system with a hydraulic rotary actuator in a two-part stabilizer system. A two-part stabilizer system can have a first stabilizer part which is non-rotationally connected to a rotary actuator shaft, and a second stabilizer part which is connected non-rotationally to a rotary actuator housing.

2. Background Information

One problem with some stabilizer systems is that the connection of the stabilizer parts to the rotary actuator is realized by means of spline connections. Basically, such spline connections have a significant disadvantage in terms of cost. A further disadvantage lies in the clacking noise generated during operation of the stabilizer. A certain amount of play is required for the installation of the stabilizer parts in the rotary actuator. It is virtually impossible to forcibly drive the stabilizer into the rotary actuator, since the bearing or seals would be damaged. It is conceivable that the noise problem could be solved by use of thermosetting, or age-hardening, means of fastening, which could be injected into the gaps in the spline connection. But that would mean that it would then be impossible to disassemble the stabilizer apparatus. The technical journal "Konstruktion & Elektronik" No. 17, page 9 of Aug. 5, 1992, discloses such a rotary actuator in a two-part stabilizer system.

OBJECT OF THE INVENTION

The object of the present invention is to eliminate the disadvantages of the known arrangements at an acceptable cost.

SUMMARY OF THE INVENTION

The problems of the known arrangements can be solved by Use of a plug-in connection like a clamp with a mounting bracket that serves as a connection between stabilizer parts and the rotary actuator.

The clamp essentially prevents any noises which could result from the torsional movement of the stabilizer parts relative to the rotary actuator. There is generally an accurate transmission surface through the clamping device, so that the conventional force transmission factor with a spline connection, which factor represents the portion of the bearing surface portion inside the spline connection, can be set equal to 1, and, therefore, generally has no influence on the configuration of the clamp.

It is advantageous if the clamp can preferably be formed by a split, fork-shaped locator and a tab, whereby preferably at least two tightening screws brace the locator against the tab. The fork-shaped locator can make it possible to remove the rotary actuator generally without having to disassemble the entire stabilizer system. The tightening screws can be loosened, and the rotary actuator can be pulled out of the stabilizer system. With the plug-in connection, the tab and the fork-shaped locator form the transmission surface by means of the tab and locator contact surfaces. In this case, elasticity of the fork-shaped locator can be utilized to obtain a maximum transmission surface.

In one embodiment of the present invention, the fork-shaped locator can preferably be an integral component of the rotary actuator. The manufacture of the stabilizer parts can be greatly simplified. The present invention further teaches that the tab preferably has a width which is greater than the shaft diameter of the stabilizer over the inserted length of the tab. The tab can be forged on, such as onto the stabilizer bar, so that the torsional cross-section is maintained, but the stabilizer part can be realized with the smallest possible torsional cross-section.

As a further measure to simplify the installation of the rotary actuator, the slot of the fork-shaped locator can be essentially horizontal when both stabilizer parts assume a position in which they are not substantially rotated or twisted with respect to one another. As soon as the rotary actuator is inserted, which can advantageously be done radially with respect to the stabilizer apparatus, the position of the rotary actuator can then essentially already be defined to such an extent that the installer would typically not have to hold the rotary actuator in place while tightening the tightening screws. The rotary actuator rests preferably with its locator on the tabs of the stabilizer parts.

Because the shaft of the rotary actuator can be designed as a solid shaft, the hydraulic interconnection system in the rotary actuator can be simplified. Such a hydraulic interconnection system is essentially provided for connecting the corresponding work chambers of the rotary actuator, and is generally required for operation of the rotary actuator. These work chambers can be advantageously connected by means of transverse holes disposed through the solid shaft. In addition, the diameter of the rotary actuator can also be reduced by the use of a solid shaft. The solid shaft, together with the plug-in connection, essentially closes off the rotary actuator from the environment. It is advantageous if a protective bellows, as disclosed by known arrangements to protect the interior of the rotary actuator against contamination, can be eliminated.

It should be understood that when the word "invention" is used in this application, the word "invention" includes "inventions," that is, the plural of "invention." By stating "invention," applicant does not in any way admit that the present application does not include more than one patentably and non-obviously distinct invention, and maintains the possibility that this application may include more than one patentably and non-obviously distinct invention. The applicant hereby asserts that the disclosure of this application may include more than one invention, and, in the event that there is more than one invention, that these inventions may be patentable and non-obvious, one with respect to the other.

One aspect of the invention resides broadly in a vehicular suspension system comprising: a rotary actuator; the rotary actuator comprising: a first member end a second member; the rotary actuator having a length and defining an axis of rotation along the length thereof; at least one of the first member and the second member being rotatable with respect to the other of the first member and the second member about the axis of rotation; first stabilizer bar; second stabilizer bar; apparatus for connecting the first member to the first stabilizer bar; the apparatus for connecting comprising a tongue connector; the tongue connector comprising a tongue; and the tongue connector further comprising apparatus for receiving the tongue.

Another aspect of the invention resides broadly in a method of assembling a vehicular suspension system, the vehicular suspension system comprising: a rotary actuator; the rotary actuator comprising: a first member and a second member; the rotary actuator having a length and defining an axis of rotation along the length thereof; at least one of the first member and the second member being rotatable with respect to the other of the first member and the second member about the axis of rotation; first stabilizer bar; second stabilizer bar; apparatus for connecting the first member to the first stabilizer bar; the apparatus for connecting comprising a tongue connector; the tongue connector comprising a tongue; the tongue connector further comprising apparatus for receiving the tongue; the tongue comprising four surfaces; the four surfaces comprising two major surfaces and two minor surfaces; the four surfaces each comprising an area; the area of the two major surfaces being substantially larger than the area of the two minor surfaces; the two major surfaces comprise two opposite and substantially flat surfaces; the apparatus for receiving the tongue comprising a slot for receiving and contacting the two major surfaces of the tongue; the apparatus for receiving comprising a bracket; the bracket comprising the slot for receiving the tongue; the bracket further comprising two prongs to form the slot; the two prongs having contacting surfaces for contacting the two major surfaces of the tongue; the contacting surfaces of the two prongs being substantially flat; apparatus for connecting the second member to the second stabilizer bar; the slot of the apparatus for connecting the first member to the first stabilizer bar being a first slot; another slot of the apparatus for connecting the second member to the second stabilizer bar being a second slot; the first slot having a first transverse axis disposed substantially transverse to the axis of rotation; the second slot having a second transverse axis disposed substantially transverse to the axis of rotation; the contacting surfaces of the first slot being disposed substantially parallel to the first transverse axis; the contacting surfaces of the second slot being disposed substantially parallel to the second transverse axis; the first transverse axis and the second transverse axis being substantially parallel in an installation position of the rotary actuator with the first stabilizer bar and the second stabilizer bar when the rotary actuator is deactivated; and the first stabilizer bar and the second stabilizer bar each being rotatable about a longitudinal axis parallel to the axis of rotation; the method of assembly comprising the steps of: providing the rotary actuator comprising the first member and the second member; providing the first stabilizer bar; providing the second stabilizer bar; providing the apparatus for connecting the first member to the first stabilizer bar; providing the apparatus for connecting the second member to the second stabilizer bar; providing the tongue connector comprising the tongue and the apparatus for receiving the tongue for each the apparatus for connecting; providing the first slot; providing the second slot; each the tongue connector comprising the bracket; each the tongue connector comprising two prongs; the first slot and the second slot each comprising the contacting surfaces; the method of assembly further comprising the steps of: deactivating the rotary actuator to position the first slot and the second slot so that the first transverse axis and the second transverse axis are parallel with respect to one another; connecting the first member to the first stabilizer bar by sliding the tongue with respect to the first slot; and connecting the second member to the second stabilizer bar by sliding the tongue with respect to the second slot.

Yet another aspect of the invention resides broadly in a vehicular suspension system comprising a rotary actuator; the rotary actuator comprising: a first member; and a second member; the rotary actuator having a length and defining an axis of rotation along the length thereof; at least one of the first member and the second member being rotatable with respect to the other of the first member and the second member about the axis of rotation; first stabilizer bar; second stabilizer bar; apparatus for connecting the first member to the first stabilizer bar; the apparatus for connecting comprising a tongue connector; the tongue connector comprising a tongue; and the tongue connector further comprising apparatus for receiving the tongue.

BRIEF DESCRIPTION OF THE DRAWINGS

The invention is described in greater detail below with reference to the accompanying drawings, in which:

FIG. 1a shows a cross-section of a portion of FIG. 1 along the line 1a—1a with hydraulic lines 11a, 11b omitted.

DESCRIPTION OF THE PREFERRED EMBODIMENT

Figure 1:
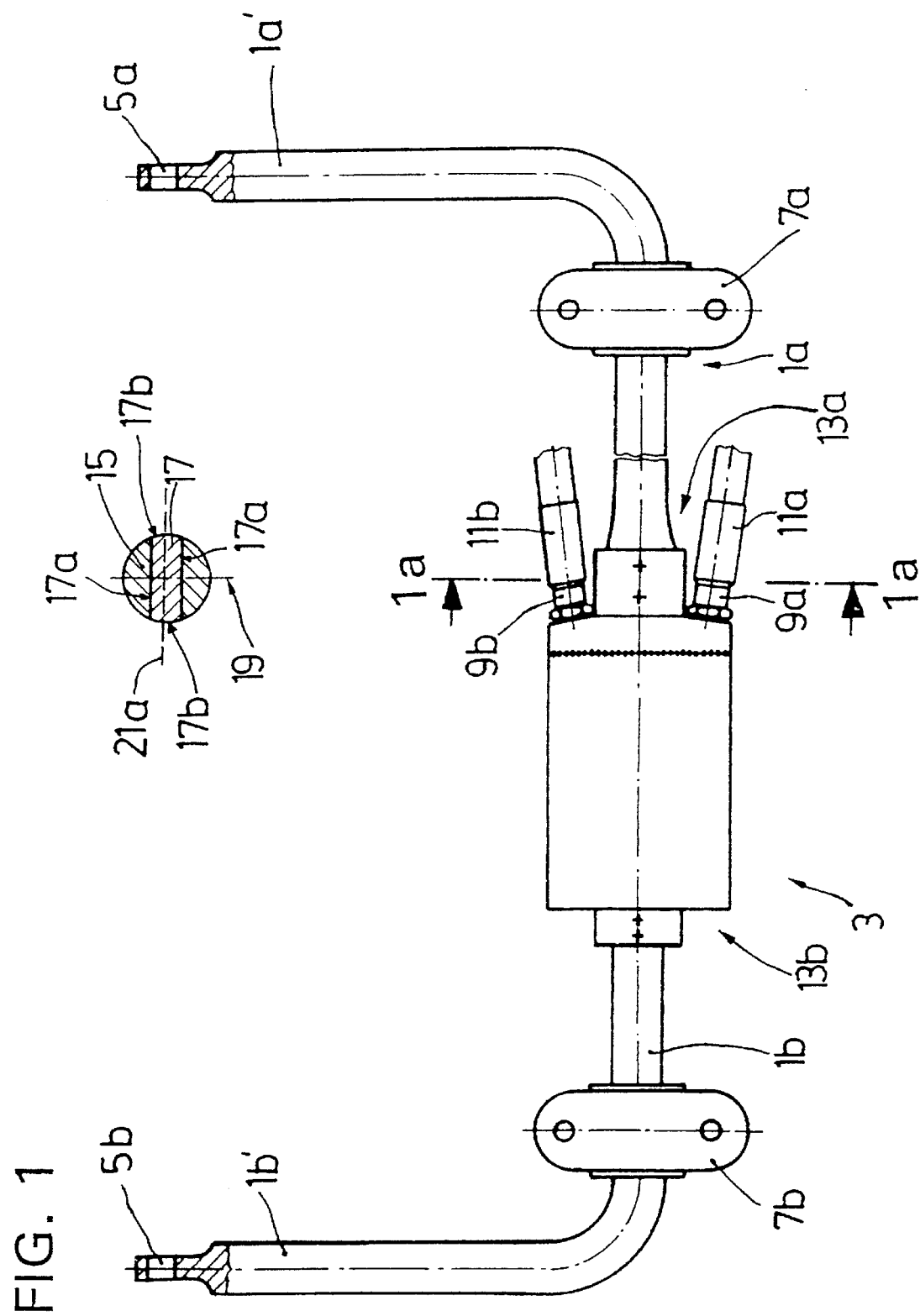
FIG. 1 schematically illustrates a stabilizer system.

FIG. 1 shows an entire stabilizer system, which could be used for a suspension system of a motor vehicle. A stabilizer system can preferably have a rotary actuator 3, which can preferably be non-rotationally connected to the stabilizer parts 1a, 1b. Both stabilizer parts 1a, 1b preferably have ends 1a', 1b' offset by 90 degrees, which end 1a', 1b'can include a connection 5a, 5b for the wheel control arms (not shown in this figure, but typically well known). The entire stabilizer system can be connected to the vehicle chassis by means of rotating joints 7a, 7b. Hydraulic fluid can preferably be supplied by means of hydraulic connections 9a, 9b together with hydraulic lines 11a, 11b.

The stabilizer parts 1a, 1b can be connected by means of plug-in connections or tongue connectors 13a, 13b, which are only shown schematically in FIG. 1. As illustrated in FIG. 1a, the width of the stabilizer parts 1a, 1b in the vicinity of the plug-in connections 13a, 13b is greater than the rest of the shaft diameter.

Figure 2:
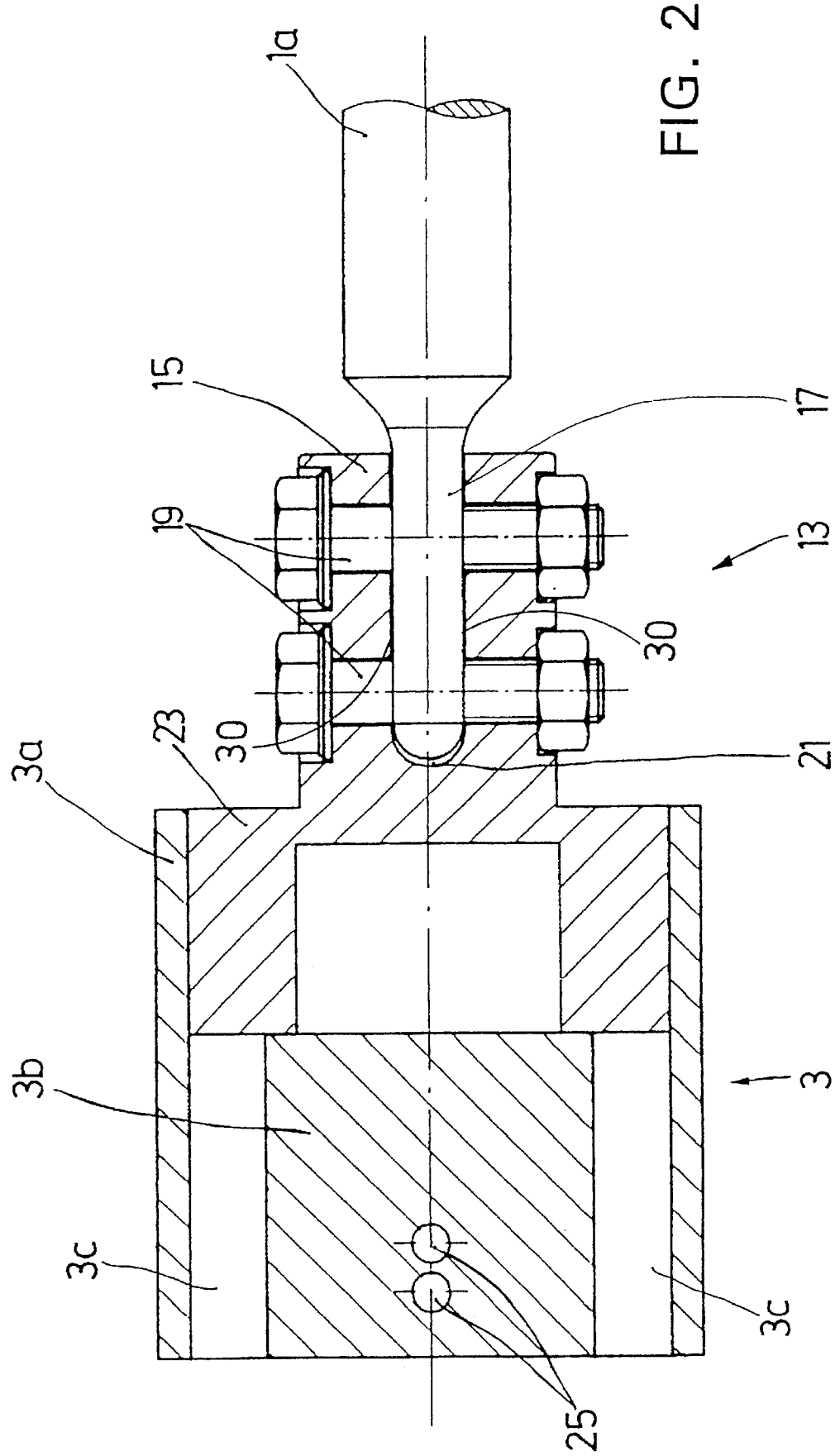
FIG. 2 schematically illustrates a section of the stabilizer system in the vicinity of the plug-in connection.

FIG. 2 is restricted to the vicinity of a plug-in connection, such as the plug-in connection 13a of FIG. 1.

The plug-in connection 13a, preferably includes a fork-shaped slotted locator or bracket 15, in which a tab or tongue 17 of the stabilizer part 1a can preferably be engaged. As shown in FIG. 1a, the tab or tongue 17 can have two major surfaces 17a disposed opposite one another, and two minor surfaces 17b disposed opposite one another. Two holes, or alternatively, a slot, make it possible to insert preferably at least two tightening screws 19 which brace the seat, or slotted locator 15 against the tab 17. This can create a transmission surface for the torsional moment of the stabilizer. The surface can be defined by the contact surfaces 30 between the tab 17 and the locator 15. In the vicinity of the tab 17, the stabilizer part 1a can preferably be shaped so that it essentially has the same width as a slot 21 of the locator 15 (see also FIG. 1a). As shown in FIG. 1a, the slot 21 can have an axis 21a, which axis 21a is transverse with respect to the axis of rotation of the rotary actuator 3.

Depending on the required quality of the connection, simple threaded pillars or dowel screws 19 can be used. These screws 19 can be supported by commercially available locking pistons so that a tool can be used to tighten the screws from an installation side. At least two screws 19 should preferably be used, since otherwise a hinged joint can occur inside the plug-in connection 13. In addition, a greater number of screws can increase the quality of the connection, since the elasticity of the fork-shaped locator 15 can be better utilized.

The slot 21 in the fork-shaped locator 15 can make possible an easy installation and removal of the rotary actuator 3 while the wheels are suspended, generally without requiring the removal of the entire stabilizer system from the vehicle. The screws 19 can generally be removed very easily from the mounting bracket without the use of a tool or without the installer himself having to hold the rotary actuator 3 in place during this step. The rotary actuator 3 preferably rests with its fork-shaped locator 15 on the tab 17 of the two stabilizer parts 1a, 1b.

The fork-shaped locator 15 can preferably be rigidly connected to a cap 23 of the rotary actuator housing 3a. In the present embodiment, the locator 15 and cap 23 can preferably be realized as one piece. There can preferably also be a rigid connection between the cap 23 and the rotary actuator housing 3a, such as a weld. As a result of this closed construction, there is generally no need for a protective bellows between the rotary actuator housing 3a of the locator 15 and the cap 23.

A rotary actuator shaft 3b generally rotates in relation to the rotary actuator housing 3a in the event of uneven spring deflection of the wheel control arms. Because the connection of the stabilizer part 1a to the actuator 3 is essentially exterior to the housing 3a, the rotary actuator shaft 3b can preferably be realized as a solid shaft. The rotary actuator shaft 3b preferably has at least one transverse hole 25 to connect corresponding work chambers (such as chambers 3c) of the rotary actuator 3 to a hydraulic system. A complicated hydraulic interconnection system inside the rotary actuator housing 3a can therefore be essentially unnecessary.

One feature of the invention resides broadly in the hydraulic rotary actuator in a two-part stabilizer system, consisting of a first stabilizer part which is non-rotationally connected to a rotary actuator shaft, and a second stabilizer part which is non-rotationally connected to a rotary actuator housing, characterized by the fact that a plug-in connection 13 with a mounting bracket 15, 17, 19 serves as a connection between the stabilizer part 1a, 1b and the rotary actuator 3.

Another feature of the invention resides broadly in the hydraulic rotary actuator characterized by the fact that the mounting bracket comprises a slotted, fork-shaped locator and a tab 17, whereby at least two tightening screws 19 brace the seat 15 against the tab 17.

Yet another feature of the invention resides broadly in the hydraulic rotary actuator characterized by the fact that the fork-shaped locator 15 is a component of the rotary actuator 3.

Still another feature of the invention resides broadly in the hydraulic rotary actuator characterized by the fact that the tab 17 is wider along its inserted length than the shaft diameter of the stabilizer 1a, 1b.

A further feature of the invention resides broadly in the hydraulic rotary actuator characterized by the fact that the slot 21 of the fork-shaped locator 15 is essentially horizontal when both stabilizer parts 1a, 1b assume a position in which they are not twisted with respect to one another.

Another feature of the invention resides broadly in the hydraulic rotary actuator characterized by the fact that the rotary actuator shaft 3b is realized as a solid shaft.

Some types of vehicular suspension systems that could be utilized in accordance with the present invention may be or are disclosed by the following U.S. Pat. Nos. 5,228,719 to Fukuyama et al., entitled "Automotive Active Suspension System for Anti-rolling Control"; 5,208,749 to Adachi et al., entitled "Method for Controlling Active Suspension System on the Basis of Rotational Motion Model"; 5,178,406 to Reynolds, entitled "Torsion Bar Suspension"; 5,286,059 to Tabs, entitled "Height Control System when Vehicle Is Jacked up"; 5,288,101 to Minnett, entitled "Variable Rate Torsion Control System for Vehicle Suspension"; 5,290,048 to Takahashi and Yamashita, entitled "Working Fluid Circuit for Active Suspension Control System of Vehicle"; 5,294,146 to Tabata and Hamada, entitled "Active Suspension of Vehicle Having System of Compensation for Cornering Force"; and 5,251,136 to Fukuyama et al., entitled "Actively Controlled Suspension System for Automotive Vehicles".

Some types of rotary actuators that could be utilized in accordance with the present invention may be or are disclosed by the following U.S. Pat. Nos.: 5,332,236 to Kaetuhara et al., entitled "Sealing Mechanism for a Rotary Actuator"; 5,309,816 to Weyer, entitled "Rotary Actuator with External Bearings"; 5,267,504 to Weyer, entitled "Rotary Actuator with Annular Fluid Coupling Rotatably Mounted to Shaft"; and 5,310,021 to Hightower, entitled "Motor-driven, Spring-returned Rotary Actuator".

All of the patents and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vehicular suspension system comprising:

a rotary actuator;

said rotary actuator comprising:
 a first member; and
 a second member;

said rotary actuator having a length and defining an axis of rotation along the length thereof;

at least one of said first member and said second member being rotatable with respect to the other of said first member and said second member about said axis of rotation;

a first stabilizer;

a second stabilizer bar;

means for connecting said first member to said first stabilizer bar;

said means for connecting comprising a tongue connector;

said tongue connector comprising a tongue;

said tongue connector further comprising means for receiving said tongue;

one of said first member and said first stabilizer bar comprising said tongue;

the other of said first member and said first stabilizer bar comprising said means for receiving said tongue;

said tongue comprising four surfaces;

said four surfaces comprising two major surfaces and two minor surfaces;

said four surfaces each comprising an area;

the area of said two major surfaces being substantially larger than the area of said two minor surfaces;

said two major surfaces comprising two opposite and substantially flat surfaces;

said means for receiving said tongue comprising a slot for receiving and contacting said two major surfaces of said tongue;

said means for receiving comprising a bracket;

said bracket comprising two prongs spaced apart from one another to form said slot between said two prongs;

said two prongs have contacting surfaces for contacting said two major surfaces of said tongue;

said contacting surfaces of said two prongs being substantially flat;

said means for receiving further comprising at least two bolts for tightening said means for receiving;

said tongue comprising at least two holes for receiving said at least two bolts;

said bracket comprising at least two holes in each of said two prongs for receiving said at least two bolts;

said vehicular suspension system further comprising means for connecting said second member to said second stabilizer bar;

one of said second member and said second stabilizer bar comprising a second tongue, said second tongue comprising four surfaces;

said four surfaces of said second tongue comprising two major surfaces and two minor surfaces;

said four surfaces of said second tongue each comprising an area;

the area of said two major surfaces of said second tongue being substantially larger than the area of said two minor surfaces of said second tongue;

said two major surfaces of said second tongue comprising two opposite and substantially flat surfaces;

the other of said second member and said second stabilizer bar comprising second means for receiving said second tongue;

said second means for receiving comprising a second bracket;

said second bracket additionally comprising two prongs spaced apart from one another to form another slot between said two prongs;

said two prongs of said second bracket having contacting surfaces for contacting said two major surfaces of said second tongue;

said contacting surfaces of said two prongs of said second bracket being substantially flat;

said slot of said means for connecting said first member to said first stabilizer bar being a first slot;

said another slot of said means for connecting said second member to said second stabilizer bar being a second slot;

said first slot having a first transverse axis disposed substantially transverse to said axis of rotation;

said second slot having a second transverse axis disposed substantially transverse to said axis of rotation;

said contacting surfaces of said first slot being disposed substantially parallel to said first transverse axis;

said contacting surfaces of said another slot being disposed substantially parallel to said second transverse axis;

said first transverse axis and said second transverse axis being substantially parallel in an installation position of said rotary actuator with said first stabilizer bar and said second stabilizer bar when said rotary actuator is deactivated;

said first stabilizer bar and said second stabilizer bar each being rotatable about a longitudinal axis parallel to said axis of rotation;

said first transverse axis and said second transverse axis being horizontal with respect to the ground when said first stabilizer bar and said second stabilizer bar are in said installation position;

said first stabilizer bar and said second stabilizer bar each having diameter measured radially with respect to said longitudinal axis;

said tongue and said second tongue each having a width measured between each of said two minor surfaces;

said width of said tongue being greater than said diameter of said first stabilizer bar; and said width of said second tongue being greater than said diameter of said second stabilizer bar.

2. The vehicular suspension system according to claim 1 wherein:

said second member of said rotary actuator comprises cylinder means;

said first member of said rotary actuator comprises shaft means;

said shaft means is at least substantially disposed within said cylinder means;

said cylinder means and said shaft means are disposed to rotate with respect to one another about said axis of rotation;

said cylinder means is disposed to rotate substantially concentrically about said shaft means; and said rotary actuator comprising at least two pairs of interconnected fluid chambers therein;

said shaft means comprises a solid shaft;

said shaft means comprising at least one fluid passage disposed radially therethrough for fluidly interconnecting a first of said two pairs of fluid chambers; and said shaft means comprising at least another fluid passage disposed radially therethrough for fluidly interconnecting a second of said two pairs of fluid chambers.

3. In a vehicular suspension system comprising a rotary actuator; said rotary actuator comprising: a first member; and a second member; said rotary actuator having a length and defining an axis of rotation along the length thereof; at least one of said first member and said second member being rotatable with respect to the other of said first member and said second member about said axis of rotation; a first stabilizer bar; a second stabilizer bar;

means for connecting said first member to said first stabilizer bar;

said means for connecting comprising a tongue connector;

said tongue connector comprising a tongue;

said tongue connector further comprising means for receiving said tongue;

one of said first member and said first stabilizer bar comprising said tongue;

the other of said first member and said first stabilizer bar comprising said means for receiving said tongue;

said tongue comprising four surfaces;

said four surfaces comprising two major surfaces and two minor surfaces;

said four surfaces each comprising an area;

the area of said two major surfaces being substantially larger than the area of said two minor surfaces;

said two major surfaces comprising two opposite and substantially flat surfaces;

said means for receiving said tongue comprising a slot for receiving and contacting said two major surfaces of said tongue;

said means for receiving comprising a bracket;

said bracket comprising two prongs spaced apart from one another to form said slot between said two prongs;

said two prongs having contacting surfaces for contacting said two major surfaces of said tongue;

said contacting surfaces of said two prongs being substantially flat;

said means for receiving further comprising at least two bolts for tightening said means for receiving;

said tongue comprising at least two holes for receiving said at least two bolts;

said bracket comprising at least two holes in each of said two prongs for receiving said at least two bolts;

one of said second member and said second stabilizer bar comprising a second tongue, said second tongue comprising four surfaces;

said four surfaces of said second tongue comprising two major surfaces and two minor surfaces;

said four surfaces of said second tongue each comprising an area;

the area of said two major surfaces of said second tongue being substantially larger than the area of said two minor surfaces of said second tongue;

said two major surfaces of said second tongue comprising two opposite and substantially flat surfaces;

the other of said second member and said second stabilizer bar comprising second means for receiving said second tongue;

said second means for receiving comprising a second bracket;

said second bracket additionally comprising two prongs spaced apart from one another to form another slot between said two prongs of said second bracket;

said two prongs of said second bracket having contacting surfaces for contacting said two major surfaces of said second tongue;

said contacting surfaces of said two prongs of said second bracket being substantially flat;

said slot of said means for connecting said first member to said first stabilizer bar being a first slot;

said another slot of said means for connecting said second member to said second stabilizer bar being a second slot;

said first slot having a first transverse axis disposed substantially transverse to said axis of rotation;

said second slot having a second transverse axis disposed substantially transverse to said axis of rotation;

said contacting surfaces of said first slot being disposed substantially parallel to said first transverse axis;

said contacting surfaces of said second slot being disposed substantially parallel to said second transverse axis;

said first transverse axis and said second transverse axis being substantially parallel in an installation position of said rotary actuator with said first stabilizer bar and said second stabilizer bar when said rotary actuator is deactivated;

said first stabilizer bar and said second stabilizer bar each being rotatable about a longitudinal axis parallel to said axis of rotation;

said first transverse axis and said second transverse axis being horizontal with respect to the ground when said first stabilizer bar and said second stabilizer bar are in said installation position;

said first stabilizer bar and said second stabilizer bar each having a diameter measured radially with respect to said longitudinal axis;

each of said tongue and said second tongue having a width measured between each of said two minor surfaces;

said width of said tongue being greater than said diameter of said first stabilizer bar; and said width of said second tongue being greater than said diameter of said second stabilizer bar.

4. In a vehicular suspension system according to claim 3 wherein:

said first member of said rotary actuator comprises shaft means;

said second member of said rotary actuator comprises cylinder means;

said cylinder means and said shaft means are disposed to rotate with respect to one another about said axis of rotation;

said shaft means is at least substantially disposed within said cylinder means;

said cylinder means is disposed to rotate substantially concentrically about said shaft means;

said rotary actuator comprising at least two pairs of fluid chambers therein;

said shaft means comprises a solid shaft;

said shaft means comprising at least one fluid passage disposed radially therethrough for fluidly connecting a first of said two pairs of fluid chambers; and said shaft means comprising at least another fluid passage disposed radially therethrough for fluidly connecting a second of said two pairs of fluid chambers.

\* \* \* \* \*

UNITED STATES PATENT AND TRADEMARK OFFICE
CERTIFICATE OF CORRECTION

PATENT NO. : 5,527,061
DATED : June 18, 1996
INVENTOR(S) : Adolf KARL

It is certified that error appears in the above-indentified patent and that said Letters Patent is hereby corrected as shown below:

In column 1, line 45, after 'by', delete "Use" and insert --use--.

In column 2, line 54, after the first occurrence of 'member', delete "end" and insert --and--.

In column 6, line 3, after 'Adachi', delete "etal.," and insert --et al.,--.

In column 6, line 7, before 'entitled', delete "Tabs," and insert --Tabe,--.

In column 6, lines 18-19, after 'to', delete "Kaetuhara" and insert --Kastuhara--.

In column 6, line 45, Claim 1, after 'stabilizer' insert --bar--.

Signed and Sealed this

Twenty-eighth Day of January, 1997

Attest:

BRUCE LEHMAN

Attesting Officer     Commissioner of Patents and Trademarks